(12) United States Patent
Jennings et al.

(10) Patent No.: US 7,920,847 B2
(45) Date of Patent: Apr. 5, 2011

(54) METHOD AND SYSTEM TO PROTECT THE PRIVACY OF PRESENCE INFORMATION FOR NETWORK USERS

(75) Inventors: Cullen F. Jennings, San Jose, CA (US); Cary W. FitzGerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1396 days.

(21) Appl. No.: 11/129,970

(22) Filed: May 16, 2005

(65) Prior Publication Data
US 2006/0258332 A1 Nov. 16, 2006

(51) Int. Cl.
*H04M 1/66* (2006.01)
*G06F 7/00* (2006.01)

(52) U.S. Cl. ..... 455/411; 455/410; 455/418; 379/93.02; 379/93.24

(58) Field of Classification Search ................. 455/411, 455/410, 414.1, 418, 426.1, 426.2; 709/207, 709/229; 379/93.02, 93.24, 100.09
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,134,610 A | 7/1992 | Shand et al. | 370/60 |
| 5,526,416 A | 6/1996 | Dezonno et al. | 379/265 |
| 5,649,105 A | 7/1997 | Aldred et al. | 395/200.04 |
| 5,724,420 A | 3/1998 | Torgrim | 379/372 |
| 5,742,905 A | 4/1998 | Pepe et al. | 455/461 |
| 5,940,591 A | 8/1999 | Boyle et al. | |
| 5,991,645 A | 11/1999 | Yuen et al. | 455/568 |
| 6,295,354 B1 | 9/2001 | Dezonno | 379/266 |
| 6,301,339 B1 | 10/2001 | Staples et al. | |
| 6,353,886 B1 | 3/2002 | Howard et al. | 713/156 |
| 6,463,471 B1 | 10/2002 | Dreke et al. | |
| 6,501,750 B1 | 12/2002 | Shaffer et al. | 370/352 |
| 6,510,162 B1 | 1/2003 | Fijolek et al. | 370/432 |
| 6,546,087 B2 | 4/2003 | Shaffer et al. | 379/90.01 |
| 6,546,097 B1 | 4/2003 | Peltz | 379/265.07 |
| 6,567,505 B1 | 5/2003 | Omori et al. | 379/84 |
| 6,697,462 B2 * | 2/2004 | Raymond | 379/93.02 |
| 6,748,543 B1 | 6/2004 | Vilhuber | 713/201 |
| 6,751,463 B1 | 6/2004 | Lorello et al. | 455/466 |
| 6,754,712 B1 | 6/2004 | Valencia | 709/227 |
| 6,757,722 B2 | 6/2004 | Leppänen et al. | 709/220 |
| 6,760,322 B1 | 7/2004 | Fukuda et al. | 370/352 |
| 6,766,165 B2 | 7/2004 | Sharma et al. | 455/423 |
| 6,785,266 B2 | 8/2004 | Swartz | 370/352 |
| 6,788,779 B2 | 9/2004 | Ostapchuck | 379/265.02 |

(Continued)

OTHER PUBLICATIONS

*USPTO; Office Action* for U.S. Appl. No. 11/129,949, filed May 16, 2005 in the name of Cullen F. Jennings; 13 pages, Mar. 25, 2009.

(Continued)

*Primary Examiner* — Melur Ramakrishnaiah
(74) *Attorney, Agent, or Firm* — Baker Botts L.L.P.

(57) ABSTRACT

In accordance with a particular embodiment of the present invention, a method for providing privacy protection to network users includes receiving a subscription request from a first end user. The subscription request identifies a second end user for whom the first end user would like to become a registered presence watcher. A cost to be assessed to become the registered presence watcher of the second end user is determined, and the first user is registered as the registered presence watcher of the second end user.

24 Claims, 3 Drawing Sheets

U.S. PATENT DOCUMENTS

| | | | | |
|---|---|---|---|---|
| 6,807,423 | B1 | 10/2004 | Armstrong et al. | 455/440 |
| 6,853,634 | B1 | 2/2005 | Davies et al. | 370/349 |
| 6,928,473 | B1 | 8/2005 | Sundaram et al. | |
| 6,930,983 | B2 | 8/2005 | Perkins et al. | 370/252 |
| 7,010,292 | B2 | 3/2006 | Jerbi et al. | 455/414.1 |
| 7,039,713 | B1 | 5/2006 | Van Gunter et al. | 709/229 |
| 7,042,988 | B2 | 5/2006 | Juitt et al. | 379/88.17 |
| 7,043,643 | B1 | 5/2006 | Doe et al. | 713/189 |
| 7,043,753 | B2 | 5/2006 | Roddy et al. | 726/11 |
| 7,058,387 | B2 | 6/2006 | Kumar et al. | |
| 7,062,563 | B1 | 6/2006 | Lewis et al. | |
| 7,149,801 | B2 * | 12/2006 | Burrows et al. | 709/225 |
| 7,242,421 | B2 | 7/2007 | Center, Jr. et al. | 348/14.1 |
| 7,260,632 | B2 | 8/2007 | Shaffer et al. | |
| 7,379,461 | B2 | 5/2008 | Wu et al. | |
| 7,418,736 | B2 | 8/2008 | Ghanea-Hercock | |
| 2001/0042202 | A1 | 11/2001 | Horvath et al. | |
| 2002/0019853 | A1 | 2/2002 | Vange et al. | 709/207 |
| 2002/0024947 | A1 | 2/2002 | Luzzatti et al. | |
| 2002/0112073 | A1 | 8/2002 | MeLampy et al. | |
| 2002/0150041 | A1 | 10/2002 | Reinshmidt et al. | 370/216 |
| 2002/0172365 | A1 | 11/2002 | Nakagomi et al. | |
| 2002/0181394 | A1 | 12/2002 | Partain et al. | |
| 2003/0107991 | A1 | 6/2003 | Tezuka et al. | 370/229 |
| 2003/0225549 | A1 | 12/2003 | Shay et al. | |
| 2004/0034793 | A1 | 2/2004 | Yuan | |
| 2004/0071084 | A1 | 4/2004 | El-Hennawey et al. | 370/230 |
| 2004/0073690 | A1 | 4/2004 | Hepworth et al. | |
| 2004/0249910 | A1 | 12/2004 | Jerbi et al. | |
| 2005/0022180 | A1 | 1/2005 | Couturier | 717/173 |
| 2005/0066033 | A1 | 3/2005 | Cheston | |
| 2005/0075842 | A1 | 4/2005 | Ormazabal et al. | |
| 2005/0083912 | A1 | 4/2005 | Afshar et al. | |
| 2005/0086495 | A1 | 4/2005 | Sheth et al. | 713/182 |
| 2005/0188194 | A1 | 8/2005 | Fascenda | |
| 2005/0210148 | A1 | 9/2005 | Kato et al. | |
| 2005/0228895 | A1 * | 10/2005 | Karunamurthy et al. | 709/229 |
| 2005/0232184 | A1 | 10/2005 | Borella | |
| 2005/0262195 | A1 | 11/2005 | Ono et al. | 709/203 |
| 2005/0283837 | A1 | 12/2005 | Olivier et al. | 726/24 |
| 2006/0041936 | A1 | 2/2006 | Anderson et al. | |
| 2006/0047782 | A1 | 3/2006 | Niemi | 709/220 |
| 2006/0070003 | A1 | 3/2006 | Thompson et al. | 715/758 |
| 2006/0095560 | A1 | 5/2006 | Wu et al. | 709/224 |
| 2006/0130127 | A1 | 6/2006 | Kaler et al. | |
| 2006/0167991 | A1 | 7/2006 | Heikes et al. | |
| 2006/0253458 | A1 | 11/2006 | Dixon et al. | |

OTHER PUBLICATIONS

USPTO Office Action for U.S. Appl. No. 11/130,439, filed May 16, 2005, inventor Jennings, 13 pages, Apr. 6, 2009.

USPTO Office Action for U.S. Appl. No. 11/089,743, filed Mar. 25, 2005, inventor Jennings, 15 pages, Apr. 15, 2009.

S. Blake et al., "An Architecture for Differentiated Services," RFC 2475, The Internet Society, 36 pages, 1998.

E. Crawley et al., "RFC 2386—A Framework for QoS-based Routing in the Internet," RFC 2386, The Internet Society, 31 pages, 1998.

M Day et al., "A Model for Presence and Instant Messaging," RFC 2778, The Internet Society, 17 pages, 2000.

RealVNC, *About RealVNC*, RealVNC Ltd., 3 pages, 2002-2004.

Nortel Networks, *Eliminating Boundaries*, www.nortelnetworks.com, pp. 1-10, 2004.

www.webopedia.com, *firewall* definition, 2 pages, Aug. 26, 2004.

www.webopedia.com, *virtual network computing* definition, 2 pages, Jan. 21, 2005.

Patent Pending U.S. Appl. No. 11/089,743, entitled *Method and System Using Quality of Service Information for Influencing a User's Presence State*, by Cullen F. Jennings et al., pp. 1-34 plus 2 pages of drawings, filed Mar. 25, 2005.

Patent Pending U.S. Appl. No. 11/092,782, entitled *Method and System Indicating a Level of Security for VOIP Calls Through Presence*, by Cary W. Fitzgerald et al., pp. 1-37 plus 2 pages of drawings, filed Mar. 28, 2005.

Patent Pending U.S. Appl. No. 11/129,949, entitled Method and System Using Presence Information to Manage Network Access, by Cullen F. Jennings et al., pp. 1-28 plus 2 pages of drawings, filed Mar. 28, 2005.

Patent Pending U.S. Appl. No. 11/130,439, entitled *Method and System Using Shared Configuration Information to Manage Network Access for Network Users*, by Cullen F. Jennings et al., pp. 1-40 plus 2 pages of drawings, filed May 16, 2005.

USPTO Office Action for U.S. Appl. No. 11/092,782, filed Mar. 28, 2005, inventor Fitzgerald, 12 pages, May 18, 2009.

USPTO Office Action for U.S. Appl. No. 11/130,439, filed May 16, 2005, inventor Jennings, 3 pages, May 13, 2009.

USPTO Office Action for U.S. Appl. No. 11/089,743, filed Mar. 25, 2005, inventor Jennings, 12 pages, Jul. 23, 2009.

Richardson et al., "Virtual Network Computing," IEEE Internet Computing, vol. 2, No. 1, title page plus p. 33-38, Jan./Feb. 1998.

USPTO Office Action, for U.S. Appl. No. 11/089,743, Jennings, Sep. 23, 2008.

USPTO Office Action, for U.S. Appl. No. 11/129,949, Jennings, Nov. 21, 2008.

USPTO Office Action, for U.S. Appl. No. 11/092,782, Fitzgerald, Nov. 28, 2008.

*USPTO; Office Action* for U.S. Appl. No. 11/129,949, Cullen F. Jennings, Notification Date Sep. 4, 2009, 14 pages.

*USPTO; Office Action* for U.S. Appl. No. 11/092,782, filed Mar. 28, 2005 in the name of Cary W. FitzGerald; 11 pages, Oct. 19, 2009.

*USPTO; Office Action* for U.S. Appl. No. 11/130,439, filed May 16, 2005 in the name of Cullen F. Jennings; 12 pages, Nov. 18, 2009.

PCT Search Report for International Application No. PCT/US06/17331, 9 pages, Sep. 6, 2006.

USPTO Office Action, U.S. Appl. No. 11/092,782, filed Mar. 28, 2005, inventor Fitzgerald,13 pages, Apr. 6, 2010.

USPTO Office Action, U.S. Appl. No. 11/089,743, inventor Fitzgerald, 10 pages, Jan. 21, 2010.

USPTO Office Action, U.S. Appl. No. 11/129,949; inventor Jennings, 16 pages, Feb. 24, 2010.

State Intellectual Property Office of the People's Republic of China, The First Office Action, Filing No. 200680010477.1, 9 pages, Jan. 8, 2010.

* cited by examiner

FIG. 1

METHOD AND SYSTEM TO PROTECT THE PRIVACY OF PRESENCE INFORMATION FOR NETWORK USERS

RELATED APPLICATIONS

The present application is related to co-pending U.S. patent application Ser. No. 11/089,743, entitled Method and System Using Quality of Service Information for Influencing a User's Presence State, filed Mar. 25, 2005; Ser. No. 11/092,782, entitled Method and System Indicating a Level of Security for VoIP Calls Through Presence, filed Mar 28, 2005; Ser. No. 11/129,949, entitled Method and System Using Presence Information to Manage Network Access, filed May 16, 2005; and Ser. No. 11/130,439, entitled Method and System Using Shared Configuration Information to Manage Network Access for Network Users, filed May 16, 2005, the disclosures of which are hereby incorporated by reference, as if fully set forth herein.

TECHNICAL FIELD OF THE INVENTION

This invention relates in general to communication systems and, more particularly, to a method and system to protect the privacy of presence information for network users.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, new protocols may be developed for the elimination or reduction of spam emails and other communications received by network users. Spam communications typically refer to the flood of unwanted and unsolicited communications that are received by network users everyday. Often these spam communications include advertisements and commercial solicitations for dubious products and services. Use of the Internet by network users for both personal and business reasons has opened the door to spam communications. Existing communication networks and systems do not provide adequate privacy protection against these spam communications. This deficiency imposes a significant drain on worker productivity and network resources.

SUMMARY OF THE INVENTION

The present invention provides a method and system for the selective establishment of a communication session that substantially eliminates or reduces at least some of the disadvantages and problems associated with previous methods and systems.

In accordance with a particular embodiment of the present invention, a method for providing privacy protection to network users includes receiving a subscription request from a first end user. The subscription request identifies a second end user for whom the first end user would like to become a registered presence watcher. A cost to be assessed to become the registered presence watcher of the second end user is determined, and the first user is registered as the registered presence watcher of the second end user.

Certain embodiments of the present invention may provide a number of technical advantages. For example, according to one embodiment of the present invention, an architecture and process are provided that requires an initiator of a communication session to pre-register or subscribe to receive presence information for a network user before a communication session can be established with that network user. Pre-registration allows communications received from the initiating user to be verified and authorized by the network before the communications are forwarded to their final destination. A further advantage may be that the registration or subscription may come at a financial, transactional, or computational cost to the registering user. Even where the cost to the first user is nominal on a per-subscription or per-transaction basis, the cost may be such to prevent unwanted and unsolicited communications such as spam. As a result, the nominal cost may provide privacy protection to network users by reducing the amount of unwanted and unsolicited communications received by network users.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
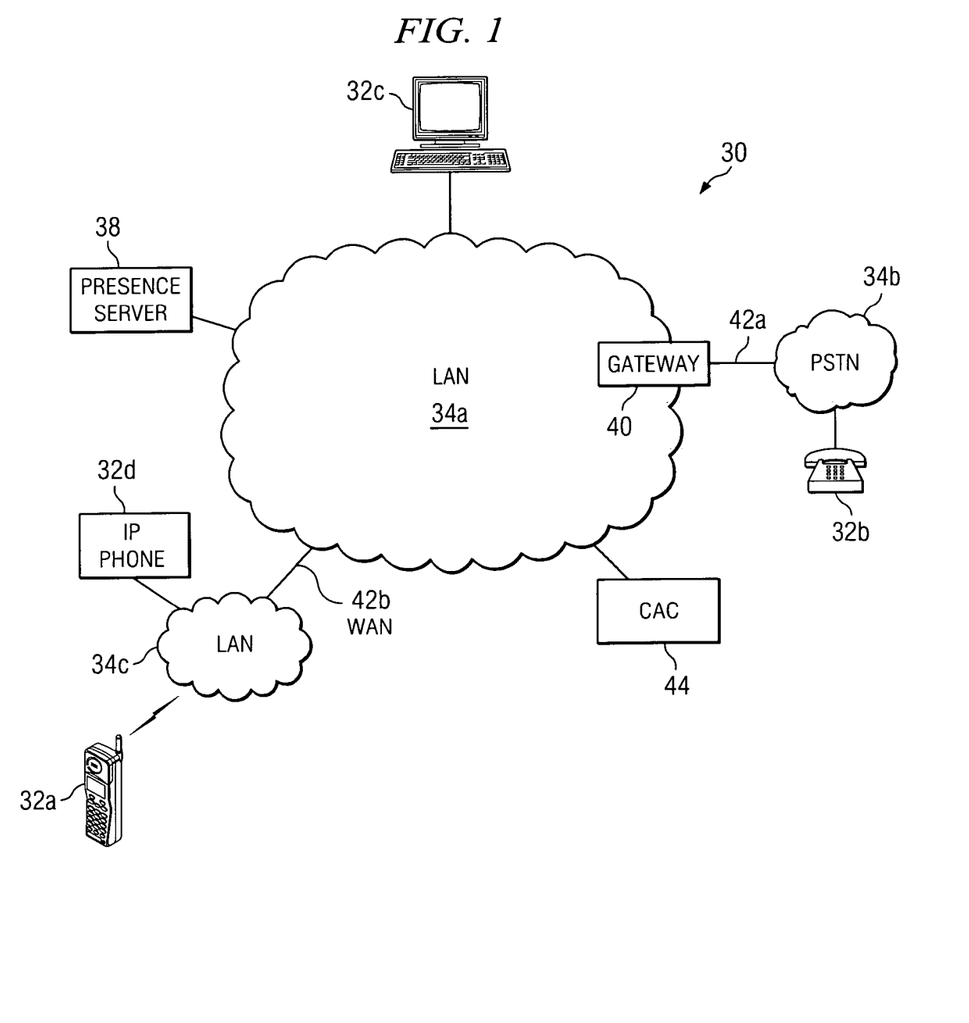
FIG. 1 illustrates a communication system for providing privacy protection to network users, in accordance with a particular embodiment of the present invention.

FIG. 1 illustrates a communication system 30 for providing privacy protection to an end user. System 30 includes a plurality of endpoints 32a-32d having the ability to establish communication sessions between each other, using one or more of communication networks 34a-34c. System 30 also includes a presence server 38 that operates to monitor presence information for the plurality of endpoints 32a-32c and to provide authorization services for incoming communications. In particular embodiments, users of system 30 may register to receive presence information for other users on a subscription basis that comes at a financial, transactional, or computational cost to the registering users. For example, a first user may be required to subscribe for presence information for a second user before the first user can initiate a communication session with the second user. When the first user then initiates the communication session, a presence server 38 may perform authorization services by verifying that the first user is a subscribing presence watcher of the second user before allowing the communication session to be established. Even where the cost to the first user is nominal on a per subscription basis, the cost may be such to prevent unauthorized or unwanted communications such as those commonly referred to as "spam," telemarketing, cold calling, etc. Thus, presence servers 38 may use this nominal cost to provide privacy protection to users of networks 34.

It will be recognized by those of ordinary skill in the art that endpoints 32a-32d, presence server 38, and/or gateway 40 may be any combination of hardware, software, and/or encoded logic that provides communication services to a user. For example, each endpoint 32a-32d may include a telephone, a computer, a video monitor, a camera, an IP phone, a cell phone, or any other communication hardware, software, and/or encoded logic that supports the communication of packets of media (or frames) using communication networks 34a-34c. Endpoints 32a-32d may also include unattended or automated systems, gateways, other intermediate components, or other devices that can establish media sessions. Although FIG. 1 illustrates a particular number and configuration of endpoints, presence servers, segments, nodes, and gateways, communication system 30 contemplates any number or arrangement of such components for communicating media. Furthermore, the endpoints 32 of system 30 may be associated with any number of users.

As illustrated, system 30 includes three communication networks 34a-34c. The term "communication network" should be interpreted as generally defining any network capable of transmitting audio and/or video telecommunication signals, data, and/or messages, including signals, data or messages transmitted through text chat, instant messaging and e-mail. Generally, communication networks 34a-34c provide for the communication of packets, cells, frames, or other portions of information (generally referred to as packets herein) between endpoints 32a-32d. Communication links 42a and 42b couple communication networks 34a and 34b, and communication networks 34a and 34c, respectively. Accordingly, users of endpoints 32a-32d can establish communication sessions between and among each network component coupled for communication with one or more of networks 34a-34c. A call admission control (CAC) system 44 may be used to monitor the amount of bandwidth available over communication networks 34a-34c.

In the illustrated embodiment, communication network 34a is a local area network (LAN) that enables communication between a plurality of endpoints 32a-32d distributed across multiple cities and geographic regions. Communication network 34b is a public switched telephone network (PSTN) and couples endpoint 32a with communication network 34a through gateway 40. Communication network 34c is another LAN, which couples endpoints 32a and 32d with communication network 34a. Communication link 42b is a wide area network (WAN), which couples LANs 34a and 34c. However, the described communication networks 34a-34c are merely provided as an example configuration of communication networks. It is recognized that any one of networks 34a-34c may be implemented as a local area network (LAN), wide area network (WAN), global distributed network such as the Internet, Intranet, Extranet, or any other form of wireless or wireline communication network.

In a particular embodiment, communication network 34a employs voice communication protocols that allow for the addressing or identification of endpoints and other network devices coupled to communication network 34a. For example, using Internet protocol (IP), each of the components coupled together by communication network 34a in communication system 30 may be identified in information directed using IP addresses. In this manner, network 34a may support any form and/or combination of point-to-point, multicast, unicast, or other techniques for exchanging media packets among components in communication system 30. Any network components capable of exchanging audio, video, or other data using frames or packets, are included within the scope of the present invention.

Network 34a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 34a may also be coupled to non-IP telecommunication networks through the use of interfaces or components, for example gateway 40. In the illustrated embodiment, communication network 34a is coupled with PSTN 34b through gateway 40. PSTN 34b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 34b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d and gateway 38 are IP telephony devices. IP telephony devices have the ability of encapsulating a user's voice (or other input) into IP packets so that the voice can be transmitted over network 34a. IP telephony devices may include telephones, fax machines, computers running telephony software, nodes, gateways, or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

In particular embodiments, users of endpoints 32a-32d may be identified by components of system 30 according to a uniform reference identifier (URI), such as a user's email address, or other suitable identifier so that a user may be located, monitored, and/or contacted through presence detection technology. Presence detection technology allows end users to maintain a single externally visible identifier regardless of their network location. For example, SIP features enable endpoints 32a-32d to discover one another and to agree on a characterization of a session they would like to share. For locating prospective session participants, and for other functions, SIP enables the creation of an infrastructure of network hosts, such as presence server 38, to which users of endpoints 32a-32d can send registrations, invitations to sessions, and other requests.

Components of system 30 may capture information about various communication devices, or endpoints, available to a user and their status, such as whether a cellular phone is switched on or whether a user is logged into a personal computer (PC). Specifically, the SIP technology allows users of endpoints 32a-32d to query for the presence of a particular user of an end point. This would provide a presence availability status for the end user, as well as location information, device information, and any personal presence status that the end user wishes to communicate to other end users. Hence, communication system 30 builds on existing SIP capabilities and, further, extends them to provide enhanced information to an end user initiating a communication session with another end user. This may be achieved using a VoIP platform. The versatility of the presence detection technology, however, enables it to be used in both IP components, such as IP phone 32d, and other non-IP components, such as components of PSTN 34b.

In particular embodiments, SIP may also include primitives supporting session setup capabilities. In an example scenario, a first end user of endpoint 32a may desire to establish a communication session with a second end user. As described above, the second end user may be associated with endpoint 32b and endpoint 32c. In accordance with the teachings of the present invention, communication system 30 offers an interface on endpoint 32a that may be displayed to the first end user to facilitate the establishment of an optimum call session between the respective parties. Specifically, the interface may display presence information for the second end user. The presence information may identify the endpoints 32b or 32c through which the second user is available for a prospective communication session. Thus, the architecture of communication system 30 allows the first end user of endpoint 32a to make a proactive or real time decision about the establishment of a communication session before the communication session is initiated.

In particular embodiments, a session setup capability that may be implemented using SIP primitives may include a registration process for subscription to presence information. Specifically, end users of networks 34 may register with presence server 38 of system 30 to subscribe to receive presence information associated with other end users. Accordingly, and as will be described in more with regard to FIG. 2, presence server 38 may include appropriate software, hardware, and/or encoded logic for receiving and verifying registration or subscription requests from end users of system 30. In particular embodiments, the registration or subscription requests may identify other end users of system 30 for whom a requesting end user would like to receive presence information. The registrations for presence information may then be used by presence server 38 to provide authorization services for incoming communications.

In an example scenario, a first end user may be associated with a first endpoint 32a, and a second end user may be associated with a second endpoint 32b, which comprises a telephone, and a third endpoint 32c, which comprises a computing device. The first end user may register with presence server 38 to receive presence information for the second end user before initiating a communication session with the second end user. As will be described below, this registration for presence information may come at some financial or computational cost to the first end user that results in fewer unwanted or frivolous communications.

When the first end user desires to establish a communication session with the second end user, the first end user of endpoint 32a may access presence information for the second end user and the associated endpoints 32b and 32c. Depending upon the particular embodiment implemented, the presence information may be displayed to the first end user over a display associated with endpoint 32a, a computer, or another network device. For example, the displayed presence information may indicate that the second end user is available to take a call on endpoint 32b or to receive an instant message or email message on endpoint 32c. The first end user may then select the endpoint 32b or 32c with which the first end user would like to establish the communication session. For example, the first end user may select the telephone of second endpoint 32b and call the number associated with that telephone to communicate with the second end user. Because the first end user has registered to receive presence information for the second end user, presence server 38 may authorize the call or otherwise allow the communication session to be established. In this manner, the registration for presence information may be required for the successful initiation and completion of communication sessions over system 30.

Figure 2:
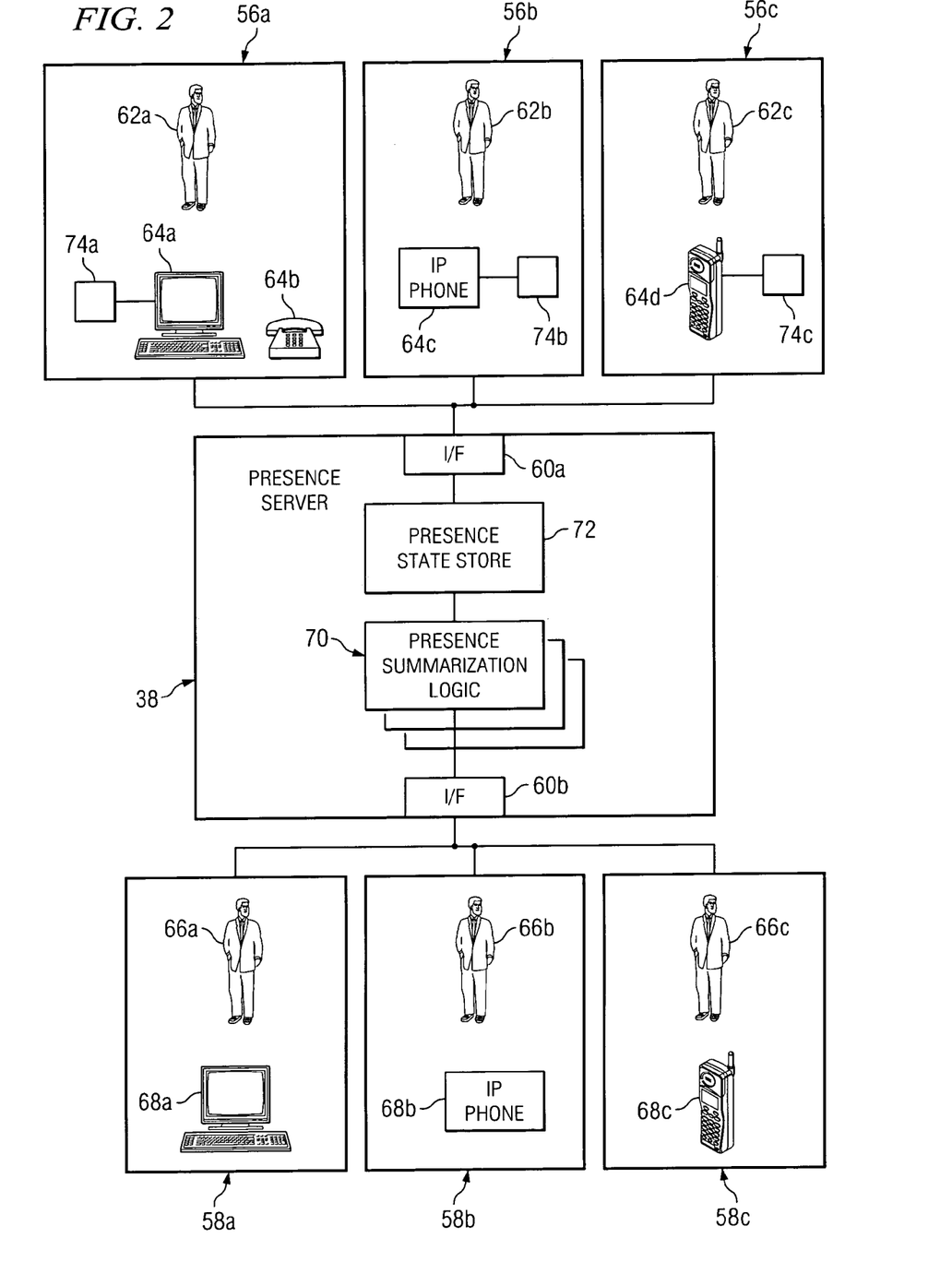
FIG. 2 illustrates the presence server of FIG. 1 in more detail, in accordance with a particular embodiment of the present invention.

FIG. 2 illustrates a presence server 38 in more detail, in accordance with a particular embodiment of the present invention. Specifically, presence server 38 is coupled to one or more presentities 56 and one or more presence watchers 58 through communication networks 34a-34c. Interfaces 60 allow presence server 38 to obtain information from presentities 56 and provide information to presence watchers 58. Examples of presence servers include presence servers as defined by Internet Society, such as in RFC2778.

Presentities 56a-56 include end users 62a-62c (and associated endpoints 64a-64d) who provide presence information to presence server 38 for distribution to other end users. Conversely, presence watchers 58a-58c include an end users 66a-66c (and associated endpoints 68a-68c) that receive presence information about other end users from presence server 38. Although presentities 56 and presence watchers 58 are illustrated as being exclusive from one another, it is generally recognized that an end user and its associated endpoints may both provide information to and receive information from presence server 38. Accordingly, any end user of presence server 38 may be both a presentity and a presence watcher.

Continuing the example scenario from above, an end user, such as first end user 62a, provides presence information to presence server 38 through interface 60a. When a presence watcher, such as second end user 66a, desires to reach first end user 62a, second end user 66a may submit a subscription request to become a presence watcher of first end user 64a. Presence server 38 is then used to process such subscription requests and to provide presence information to second end user 66a. The presence information may be used by second end user 66a, as a presence watcher, to determine the availability of first end user 62a at endpoints 64a and 64b, respectively.

Processor 70, which is illustrated as presence summarization logic 70, may include any combination of hardware (microprocessors, controllers, or other suitable computing devices or resources), software and/or encoded logic that may be used to receive and process subscription requests from end users 62. In particular embodiments, processor 70 comprises a single computer or a group of computers that are capable of receiving presence information regarding one or more presentities, such as first end user 62a, processing subscription requests from presence watchers, such as second end user 66a, and selectively providing that information to such presence watchers. In particular embodiments, processor 70 may store any subscription information included in the subscription request, such as the identity of the presence watcher, the identity of the presentity, and any financial cost to the presence watcher, if applicable, in memory module 72.

Memory module 72 may be any form of volatile or nonvolatile memory including, without limitation, magnetic media, optical media, random access memory (RAM), read-only memory (ROM), removable media, or any other suitable local or remote memory component. In particular embodiments, memory module 72 includes a list for each end user 62 in system 30. The lists may include subscription lists, buddy lists, or other association information that identify other end users 62 in system 30 for whom a particular end user, such as second end user 66a, wishes to receive presence information. In the example scenario described above, if processor 66 receives a subscription request from second end user 66a identifying first end user 62a as a desired presentity, processor 66 may add first end user 62a to the subscription list associated with second end user 66a in memory module 72.

In particular embodiments, processor 70 may access subscription information stored in memory module 72 to provide presence information to presence watchers. Continuing with the above example, when second end user 66a, as a presence watcher, desires to reach first end user 62a, a presentity, associated with endpoints 64a and 64b, processor 70 and memory module 72 may cooperate to provide presence information to second end user 66a. The presence information may be used by second end user 66a to determine the availability of first end user 62a at endpoints 64a and 64b, respectively.

Generally, presence server 38 may detect the presence of end users 62a-62c at an endpoint 64a-64d in association with one or more of presence clients 74 at the end user's endpoint 64, for example, at the end user's PC, phone, personal digital assistant (PDA) or any other presence client device (e.g., presence clients 74a-74d). In particular embodiments, for example, presence clients 74 include software or hardware embodied in a telecommunications switch that determines the hook status of a telephone or other device. In other embodiments, presence clients 74 include software that monitors whether an endpoint comprising a computer is logged into. In still other embodiments, presence clients 74 comprise devices that communicate with an ID tag worn by an end user 62 to indicate the location of the end user 62. However, although particular presence clients 74 are described, a variety of presence clients 74 may be utilized according to the teachings of the invention.

In particular embodiments, the presence information obtained about an end user 62 includes the "state" of that end user 62. End users 62 may be placed in various states, such as a "ready" state, a "not ready" state, and a "talking" state, according to the current status of the endpoint 64 with respect to presence server 38. For example, an end user 62 in a ready state may be ready and able to accept an incoming call. Accordingly, such an end user 62 may be said to be "available." Conversely, an end user 62 in a not ready state may be away from his desk or otherwise not ready to accept an incoming call, and an end user 62 in a talking state may currently be communicating on an incoming or outgoing call. In either case, the end user 62 may be said to be "unavailable."

In the example scenario described above, the presence information may be provided to second end user 66a when second end user 66a desires to initiate a communication session with first end user 62a. In particular embodiments, second end user 66a may obtain presence information for all end users 62a-62c on the subscription or buddy list of second end user 66a. Accordingly, if second end user 66a has subscribed only to receive presence information for first end user 62a, presence server 38 will only make presence information for first end user 62a available to second end user 66a. Presence information for a third end user 62b and a fourth end user 62c will not be made available to second end user 66a. Second end user 66a may reference the presence information associated with first end user 62a to determine whether second end user 66a should initiate a communication session with first end user 62a through endpoint 62a or endpoint 64b. For example, second end user 66a may use the information to determine whether he should send first end user 62a an email to be delivered at endpoint 64a (i.e., a computer) or call first end user 62a on endpoint 64b (i.e., a telephone).

Although subscription lists and buddy lists are described above for associating users of system 30 with other users of system 30, it is recognized that any other mechanism for the linkage or association of users may be utilized. It is also recognized that the such mechanisms need not be stored in memory module 72 but may be stored in any component of system 30. For example, such mechanisms may be stored at the endpoints. Other example sources of association information that may be used to provide presence information include address lists from an email program (i.e., MicroSoft contacts), information provided by social networks or reputation services, or association lists such as those used by Five Degrees of Separation, Linked In, and Orchid.

As described above, processor 70 may use the subscription lists, buddy lists, or other association information stored in memory module 72 to perform authorization services for communications directed to end users 62 of system 30. For example, when second end user 66a sends a communication from endpoint 68a to endpoint 64a, which is associated with first end user 62a, the communication may be intercepted by presence server 38. Processor 70 may then perform authorization services by verifying that that second end user 66a has subscribed to receive presence information for first end user 62a. Thus, when presence server 38 receives a communication from second end user 66a, processor 70 may access the subscriber or buddy list associated with second end user 66a to determine if the desired recipient (in this case, first end user 62a) is on the second end user's list. In particular embodiments, presence server 38 may only forward the communication to first end user 62a if first end user 62a is on the list associated with second end user 66a. Thus, pre-registration or subscription for presence information may be a prerequisite to sending communications to end users 62 of system 30.

As stated above, the registration or subscription by an end user 66 to another end user's presence information may come at a cost to the registering end user 66. Although nominal, the cost may be designed to prevent or restrict unsolicited mass emails, such as spam. In particular embodiments, the cost may be a financial cost that may be assessed on a periodic or transactional basis. Accordingly, processor 70 may include hardware, software, and/or encoded logic for performing a financial transaction. Continuing the example described above, second end user 66a may be required to pay a tenth of a cent per day to receive presence information for first end user 62a. Alternatively, second end user 66a may be required to pay a tenth of a cent for each communication session that second end user 66a seeks to initiate with first end user 62a. As still another alternative, the financial cost may comprise a one time fee that is assessed upon the receipt of a subscription or other registration request from second end user 66a.

In particular embodiments, the subscription fee remitted by a presence watcher may be paid directly to the associated presentity. As a result, subscription fees paid by registering end users 66 may be offset by subscription fees received from other end users 62. For example, second end user 66a may subscribe to receive presence information for first end user 62a and pay the resulting fee to first end user 62a. However, second end user 66a may receive a subscription fee paid by first end user 62a if first end user 62a subscribes to receive presence information for second end user 66a. Thus, subscriptions by two end users in a symmetric relationship may result in no net cost to either end user.

In still other embodiments, the cost may comprise a computational cost. As described above, the subscription for presence information may result in the continuous monitoring of presence information for each presentity identified as being of interest to a registering end user 66. Where second end user 66a is monitoring presence information for first end user 62a and any other end users of interest on a computer, the running speed of the second end user's computer may be impacted. For example, the running speed may be incrementally decreased by each end user 62 for whom second end user 66a is monitoring presence information. Thus, second end user's computer may run much faster if second end user 66a monitors presence information for only first end user 62a than if second end user 66a monitors presence information for all end users 62a-62c of system 30. As a result, it is desirable for second end user 66a to limit the number of presentities on second end user's subscription list to only those with whom legitimate communication sessions may be established.

As another example, assume second end user 66a is monitoring presence information for an end user 62 on an IP phone. Accordingly, each time second end user 66a picks up the handset to make a call, the presence information for all end users on the second end user's subscription list may be displayed to second end user 66a. The more end users 62 for whom second end user 66a monitors presence information, however, the longer it may take for the presence information to be displayed to second end user 66a. Again, the computational cost of monitoring presence information for each desired end user 62 would likely result in second end user 66a limiting the number of presentities on first end user's subscription list.

As still another example, the computational cost for monitoring presence information may result from an increase in start up time associated with an endpoint 64. In particular embodiments, endpoint 68a may execute various programmed software or other logic commands upon start-up to enable the monitoring of presence information for end users 62 on second end users 66a subscription list. The complexity or number of commands executed may be proportional to the number of end users 62 on second end user's subscription or buddy list. For example, start-up may be increased by a second or a half of a second for each end user 62 on first end user's subscription list. Accordingly, the computational start-up cost would likely result in first end user 62a limiting the number of presentities on first end user's subscription list.

In still another example, the computational cost may include the solving of a puzzle. In particular embodiments, the puzzle may include a hash algorithm that may be performed on a number or range of numbers to generate a hash number. The hash number may operate as a key that allows for the authorization of the communication and, thus, may be considered "hash cash." For example, before presence server 38 allows a communication session to be established between first end user 62a and second end user 66a, presence server 38 may require that second end user 66a, as the initiating end user, generate a hash number. Accordingly, presence server 38 may provide endpoint 68a, a network server, or another network device associated with second end user 66a with a hashing algorithm. Presence server 38 may require that end point 68a or the other network device run the hashing algorithm with a variety of inputs until the correct hash number is generated. The variety of inputs may be provided to endpoint 68a or the other network device in the form of a range or other series of numbers, or the variety of inputs may be determined entirely by endpoint 68a or the other network device. When the correct hash number is generated, the hash number may be provided to presence server 38 who may then authorize the communication session.

A hashing algorithm, however, is merely one example of a type of puzzle that may be used to authorize the communication session. In other embodiments, second end user 66a, as the initiating end user, may be quizzed or otherwise required to provide input that may be used to authorize the communication session. For example, second end user 66a may be required to compute the square root of a given number or answer a trivia question. Regardless of whether the computational cost impacts the processing time of a network device or the processing time of an end user initiating the communication session, the computational cost results in the expenditure of additional resources before a communication session is established.

As can be understood from the above examples, although the cost with respect to each instance of presence monitoring may seem nominal, the cost may rapidly accumulate where second end user 66a desires to send mass emails or other communications to many end users of system 30. Because registration and the incurring of the fee may be required before a communication may be sent to any end users of system 30, entities or organizations that commonly send thousands or even millions of unsolicited advertisements and other spam communications may be disincentivized from doing so. This is especially true where the subscription costs are not offset by symmetric relationships. Where registration or subscription is a prerequisite to delivery of a communication, unauthorized communications such as those described above may be quarantined by presence server 38 or another network device to prevent delivery of these unauthorized communications to end users of system 30.

In addition to or as an alternative to the example costs described above, presence server 38 may require the establishment of a symmetric relationship before an end user 68 may register to receive presence information for another end user 62. For example, presence server 38 may receive a subscription or other registration request from second end user 66a identifying first end user 62a as the desired presentity. In response to receiving the request, presence server 38 may send a communication to endpoint 64a associated with first end user 62a. The communication may indicate that a subscription request has been received from second end user 66a and inquire as to whether first end user 62a would like to enter into a symmetrical relationship with second end user 66a. If first end user 62a responds affirmatively, presence server 38 may register both first end user 62a and second end user 66a to receive the other's presence information. Conversely, if first end user 62a responds negatively, presence server 38 may prevent communications that are received from second end user 66a from being forwarded on first end user 62a. Because both parties must agree to participate in a symmetrical relationship before communications are transmitted between the parties, this embodiment also prevents end users of system 30 from receiving unsolicited and unwanted communications. Further, end users have a direct role in determining who is authorized to communicate with them over system 30.

It will be recognized by those of ordinary skill in the art that presence server 38 is merely one example configuration of a presence server for providing presence monitoring and communication authorization services to end users in communication system 30. It is generally recognized that presence server 38 may include any number of processors and memory modules to accomplish the functionality and features described herein. Additionally, although presence server 38 is illustrated and described as including a processor 70 and a memory module 72, these components and other desired components for performing the above-described functionality may be centrally located (local) with respect to one another, or distributed throughout communication networks 34.

Figure 3:
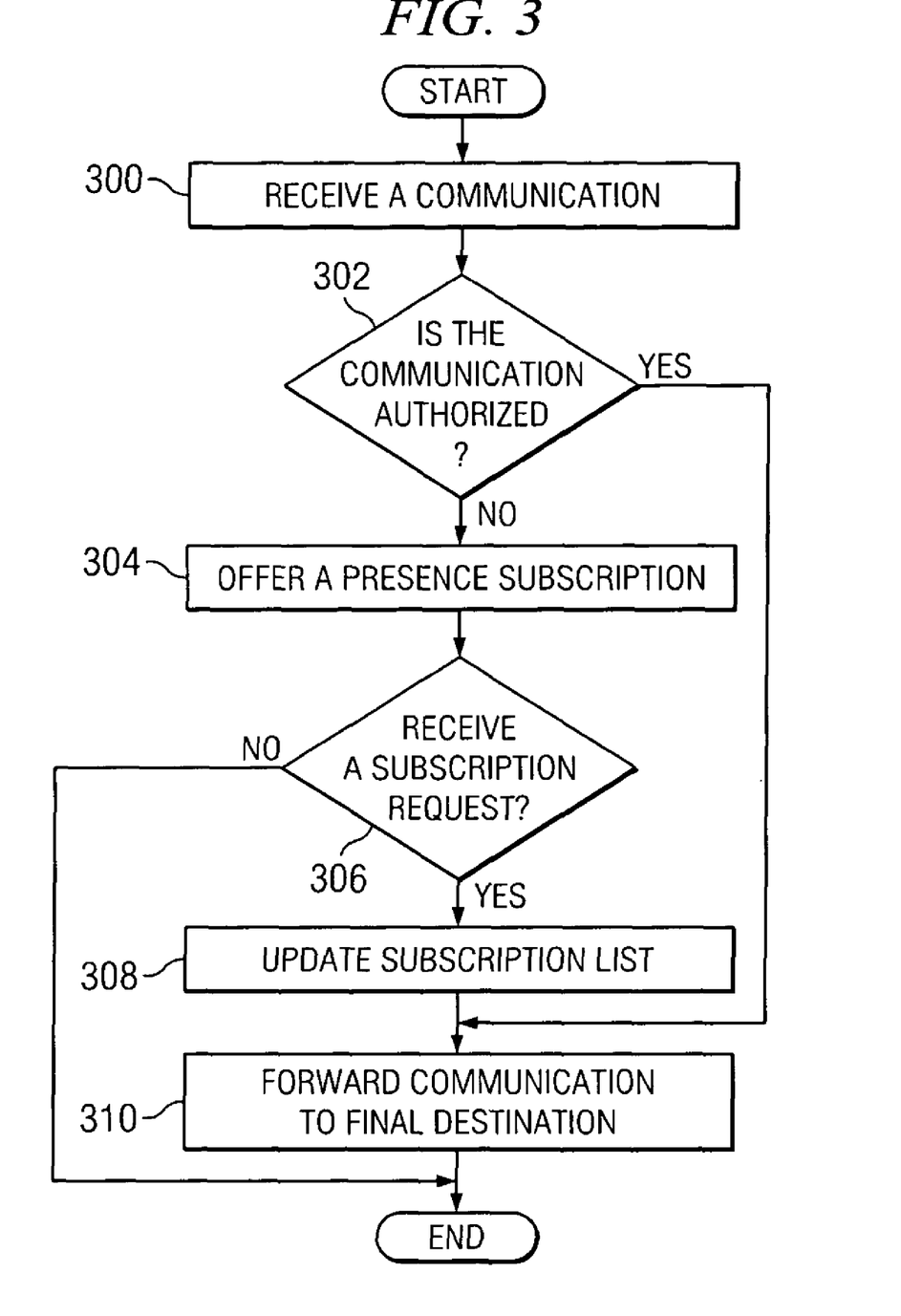
FIG. 3 illustrates an example method providing privacy protection to network users, in accordance with an embodiment of the present invention.

FIG. 3 illustrates an example method for providing privacy protection to network users. The method begins at step 300 when a communication is received from an endpoint 68*a* associated with second end user 66*a*. In particular embodiments, the communication may be received by a presence server 38 or other network device. The communication may be directed to first end user 62*a*. For example, the communication may be addressed or otherwise identified for endpoint 64*a*, which is associated with first end user 62*a*.

A determination is made at step 302 as to whether the communication is authorized. Specifically, presence server 38 may determine whether the communication is authorized by checking stored association information associated with the initiator of the communication. For example, presence server 38 may identify a subscription list, buddy list, or other association information associated with second end user 66*a*. In particular embodiments, the subscription list, buddy list, or other association information may be stored in memory 72 and may include an identification of end users for whom second end user 66*a* is a registered presence watcher. If, for example, first end user 62*a* is included on the subscription list associated with second end user 66*a*, the communication may be determined to be authorized, and the method may continue to step 310, which is described below. If first end user 62*a* is not included on the subscription list, however, the communication may be determined to be unauthorized.

If the communication is determined to be unauthorized, the method may continue to step 304, where a presence subscription may be offered to second end user 66*a*. Where accepted by second end user 66*a*, the subscription entitles second end user 66*a* to receive presence information associated with first end user 62*a*. In particular embodiments, the presence information may include availability information associated with any endpoints 32 associated with first end user 62*a*. For example, the presence information may identify whether first end user 62*a* is available to receive an email or instant message on endpoint 64*a*, which may comprise a computer, or to receive a call on endpoint 64*b*, which may comprise a telephone.

At step 306, a determination is made as whether a subscription request has been received from second end user 66*a*. Although the subscription request is illustrated as being received in response to the offer communicated in step 304, it is generally recognized that a subscription request may also be received independently of the offer and/or independently of any prior communications. If no subscription request has been received, the method terminates. Conversely, if a subscription request has been received, the method continues at step 308 where a subscription list or other association information associated with second end user 66*a* is updated. In particular embodiments, the subscription list or other association information may be updated in memory 72 by adding an identifier associated with first end user 62*a* to the second end user's list of watched presentities. Alternatively, a subscription list may be created for second end user 66*a* where one does not exist.

At step 310, the communication is forwarded to its final destination. In the example provided above, the communication is forwarded to first end user 62*a*. As a result, a communication session may be established between first and second end users 62*a* and 66*a*. Because the communication session is not established until second end user 66*a* is a subscribed presence watcher of first end user 62*a*, however, the method described provides privacy protection to first end user 62*a*.

Furthermore, and as described above, because the continuous monitoring of presence information for first end user 62*a* by second end user 66*a* may come at a financial or computational cost to second end user 66*a*, the number of unwanted and unsolicited spam communications received by first end user 62*a* may be substantially reduced.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the pre-registration or subscription for presence information for a network user before a communication session can be established with that network user. Pre-registration allows communications received from the initiating user to be verified and authorized by the network before the communications are forwarded to their final destination. A further advantage may be that the registration or subscription may come at a financial, transactional, or computational cost to the registering user. Even where the cost to the first user is nominal on a per-subscription or per-transaction basis, the cost may be such to prevent unwanted and unsolicited communications such as spam. As a result, the nominal cost may provide privacy protection to network users by reducing the amount of unwanted and unsolicited communications received by network users.

Further technical advantages may include continuous and/or real-time monitoring of presence information for a plurality of endpoints associated with a network user. Accordingly, the availability of a network user at one or more endpoints may be determined and displayed to a network user who desires to establish a communication session with the network user. Because the presence information is made available prior to the establishment of the communication session, the initiator of the communication session may make meaningful decisions about the most effective way to establish a communication session with another end user. As a result, higher quality communication sessions may be established between two end users. Additionally, a higher number of successful calls may be completed, which vastly improves efficiency parameters (particularly in the workplace).

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing privacy protection to network users, comprising:

receiving a subscription request from a first end user, the subscription request identifying a second end user for whom the first end user would like to become a registered presence watcher;

determining a cost to be assessed to become the registered presence watcher of the second end user, wherein at least a portion of the cost comprises a financial cost to be paid by the first end user;

remitting the financial cost received from the first end user to the second end user such that the financial cost paid by the first end user is paid to the second end user; and registering the first user as the registered presence watcher of the second end user.

2. The method of claim 1, further comprising:

receiving a first communication from a first endpoint associated with the first end user, the first communication directed to a second endpoint associated with the second end user;

determining that the first end user is the subscribed presence watcher of the second end user; and forwarding the communication to the second endpoint.

3. The method of claim 1, wherein the financial cost comprises a one-time subscription fee to be paid by the first end user as associated with the subscription request.

4. The method of claim 1, wherein the cost further comprises a computational cost to be incurred by the first end user.

5. The method of claim 4, further comprising:

receiving a solution to a puzzle; and authorizing a communication session between the first end user and the second end user in response to receiving the solution to the puzzle.

6. The method of claim 4, wherein the computation cost comprises the execution of programmed commands to enable the monitoring of presence information.

7. The method of claim 1, further comprising maintaining an association list identifying a plurality of end users with whom the first end user is associated in a memory; and storing information from the subscription request in the memory.

8. The method of claim 7, wherein storing the information from the subscription request in the memory comprises updating the association list to include the second end user.

9. The method of claim 1, further comprising providing presence information to the first end user, the presence information indicating the availability of the second end user at least the second endpoint.

10. The method of claim 9, wherein providing the presence information to the first end user comprises:

determining the availability of the second end user to the establishment of a communication session between the first endpoint and the second endpoint; and displaying the availability of the second end user to the first end user at the first endpoint.

11. The method of claim 1, further comprising:

receiving a subscription request from the second end user, the subscription request identifying a third end user for whom the second end user would like to become a registered presence water;

determining a cost to be assessed to become the registered presence watcher of the third end user, wherein at least a portion of the cost comprises a financial cost to be paid by the second end user; and remitting the financial cost received from the second end user to the third end user such that the financial cost paid by the second end user is paid to the third end user;

wherein the financial cost paid by the second end user is offset by the financial cost received from the first end user to the second end user.

12. The method of claim 1, further comprising:

receiving a subscription request from the second end user, the subscription request identifying that the second end user would like to become a registered presence water of the first end user;

determining a cost to be assessed to become the registered presence watcher of the second end user, wherein at least a portion of the cost comprises a financial cost to be paid by the second end user; and remitting the financial cost received from the second end user to the first end user such that the financial cost paid by the second end user is paid to the first end user;

wherein the financial cost paid by the second end user is offset by the financial cost received from the first end user such that a symmetric relationship between the first and second end users results in no net cost to the second end user, and wherein the financial cost paid by the first end user is offset by the financial cost received from the second end user such that a symmetric relationship between the first and second end users results in no net cost to the first end user.

13. A system for providing privacy protection to network users, comprising:

a plurality of endpoints operable to establish one or more communication sessions over a network; and a presence server coupled to the network, the presence server operable to:

receive a subscription request from a first end user, the subscription request identifying a second end user for whom the first end user would like to become a registered presence watcher;

determine a cost to be assessed to become the registered presence watcher of the second end user, wherein at least a portion of the cost comprises a financial cost to be paid by the first end user;

remit the financial cost received from the first end user to the second end user such that the financial cost paid by the first end user is paid to the second end user; and register the first user as the registered presence watcher of the second end user.

14. The system of claim 13, wherein the presence server is further operable to:

receive a first communication from a first endpoint associated with the first end user, the first communication directed to a second endpoint associated with the second end user;

determine that the first end user is the subscribed presence watcher of the second end user; and forward the communication to the second endpoint.

15. The system of claim 13, wherein the financial cost comprises a one-time subscription fee to be paid by the first end user as associated with the subscription request.

16. The system of claim 13, wherein the cost further comprises a computational cost to be incurred by the first end user.

17. The system of claim 16, wherein the computational cost comprises the generation of a solution to a puzzle, the presence server further operable to authorize a communication session between the first end user and the second end user in response to receiving the solution to the puzzle.

18. The system of claim 16, wherein the computation cost comprises processing required to enable the monitoring of presence information.

19. The system of claim 13, wherein the presence server is further operable to:
  maintain an association list identifying a plurality of end users with whom the first end user is associated in a memory; and
  store information from the subscription request in the memory.

20. The system of claim 19, wherein the presence server is further operable to update the association list to include the second end user.

21. The system of claim 13, wherein the presence server is further operable to provide presence information to the first end user, the presence information indicating the availability of the second end user at least the second endpoint.

22. The system of claim 21, wherein the presence server is further operable to:
  determine the availability of the second end user to the establishment of a communication session between the first endpoint and the second endpoint; and
  display the availability of the second end user to the first end user at the first endpoint.

23. A system for providing privacy protection to network users, comprising:
  means for receiving a subscription request from a first end user, the subscription request identifying a second end user for whom the first end user would like to become a registered presence watcher;
  means for determining a cost to be assessed to become the registered presence watcher of the second end user, wherein at least a portion of the cost comprises a financial cost to be paid by the first end user;
  means for remitting the financial cost received from the first end user to the second end user such that the financial cost paid by the first end user is paid to the second end user; and
  means for registering the first user as the registered presence watcher of the second end user.

24. Logic embodied in a non-transitory computer readable medium, the computer readable medium comprising code operable to:
  receive a subscription request from a first end user, the subscription request identifying a second end user for whom the first end user would like to become a registered presence watcher;
  determine a cost to be assessed to become the registered presence watcher of the second end user, wherein at least a portion of the cost comprises a financial cost to be paid by the first end user;
  remit the financial cost received from the first end user to the second end user such that the financial cost paid by the first end user is paid to the second end user; and
  register the first user as the registered presence watcher of the second end user.

* * * * *